May 27, 1958
T. D. LINSCOTT
2,836,020
CRUPPER
Filed July 26, 1954
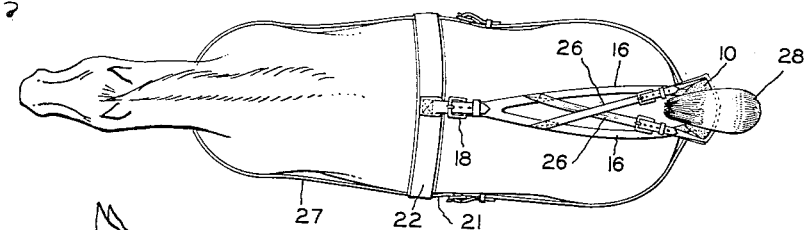
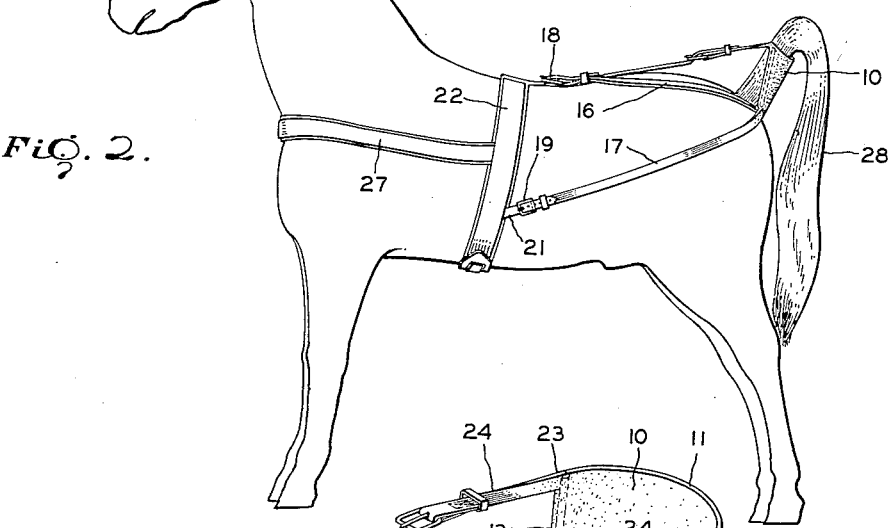
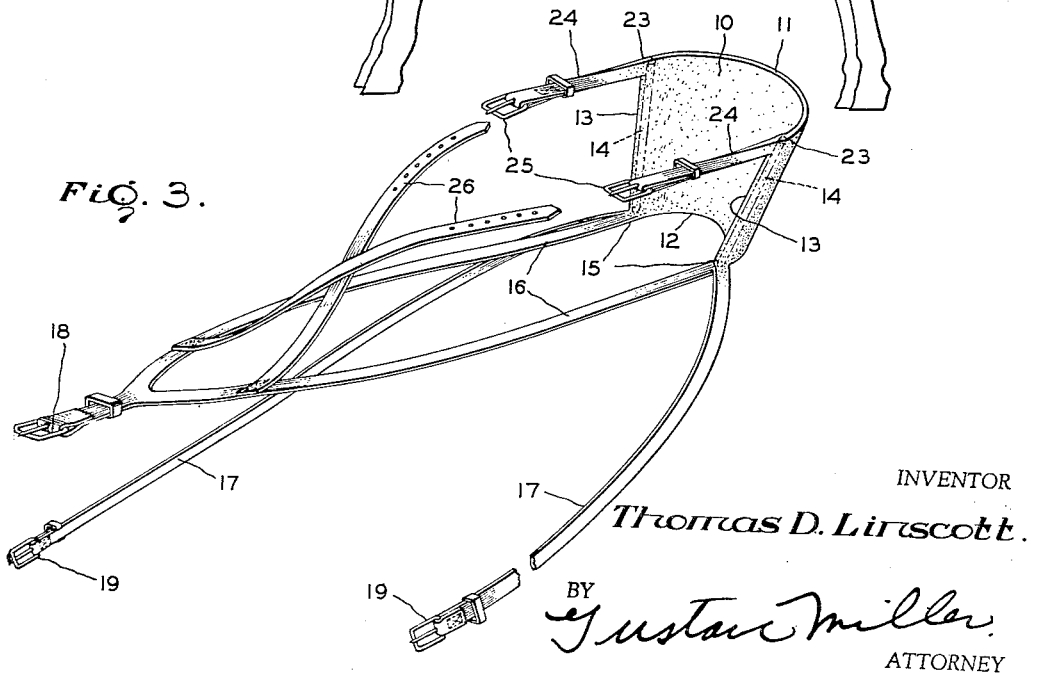
INVENTOR
Thomas D. Linscott.
BY
Gustav Miller
ATTORNEY

United States Patent Office 2,836,020
Patented May 27, 1958

2,836,020

CRUPPER

Thomas D. Linscott, Fiddletown, Calif.

Application July 26, 1954, Serial No. 445,650

1 Claim. (Cl. 54—22)

The present invention relates generally to harness for horses and specifically to a crupper device for reforming the contour of the tail of a horse for show purposes.

Many devices have been on the market for the use by horse trainers and breeders to correct the droop of the tail of a horse, most of them being of metal and providing, in one way or another, a cradle in which the heavy root of the tail is bound or tied and which cants the tail at a radically upward slant.

Most devices of the sort have been a cause of irritation to the underside of the tail root, and sores developing there are seriously liable to infection and are difficult to heal. Horses so affected, become irritable and cross, and their training and deportment is greatly handicapped.

The present device, described briefly, is a fabric or leather sling for the tail root and is made adjustable so that it may be applied with little upward angle in the beginning and may be tightened gradually as the ligaments of the tail are stretched.

The principal object of the present invention is to provide a device for humanely changing the angular contour of the tail of a horse without surgery.

Another object of the present invention is to provide a device which may be left on the root of the tail of a horse without danger of chafing or irritation to the horse.

A further object of the present invention is to provide a device economical to construct and to use, and one which does not severely bend the tail root when first applied but may be adjusted later to a greater bend of the root after the tail has begun to assume the desired shape and contour.

A still further object of the present invention is to provide a device of few parts and one easily adjusted for any size of horse.

These and other objects and advantages of the present invention will be fully apparent from the following description when considered in connection with the annexed drawings, in which:

Figure 1 is a top view of a horse showing the present invention in place,

Figure 2 is a side view in elevation of the invention as used on a horse, and

Figure 3 is a view in perspective showing the elements and their relative position.

Referring in greater detail to the drawing in which like numerals indicate like parts throughout the several views, it will be seen that the invention consists of an upstanding flexible body portion 10 of leather, heavy fabric, plastic cloth or the like, and having a shape in undeveloped form substantially a section of a cone with a top end edge 11 of greater length than the bottom end edge 12.

Secured to the leather or fabric of the body portion 10, along each of the side edges 13, are two stays 14, each being of metal and relatively unbending. These are secured in a suitable manner such as riveting or by forming the body portion 10 with a narrow sleeve on each edge into which the stays fit, whichever method is desired.

At the lower ends 15 of each side edge 13 secured by one end of each are two straps, the first of them on each side being a main body strap 16 and the second being a butt strap 17. The two body straps 16, one from each side edge, meet at their other ends remote from the body portion and are provided at their junction with a buckle 18. Each of the butt straps 17 have buckles 19 at their other ends and are meant to be fastened to strap tabs 21 on the girth band or surcingle 22, which is of conventional construction and not a part of the present invention.

At the upper ends 23 of each of the side edges of the body portion are secured other straps 24, having relatively short lengths and being provided with buckles 25 to receive the free ends of the adjusting straps 26 which cross at about their midlengths and are secured at their other ends one to each of the body straps 16, at a point a spaced distance rearwardly of their junction with each other.

It will be readily seen in Figs. 1 and 2 that the adjusting straps 26 may be tightened to cause the body portion 10 to be angled upwardly at many degrees of angularity from the horizontal, until the vertical is reached, which is about the utmost in perfection for the contour of a horse tail 28 for show purposes.

The buckle 18 is to be secured to the surcingle 22 at the top and a breast band 27 is fixed to the surcingle to prevent its shifting rearwardly to loosen the body portion away from the tail root.

While a single embodiment has been here illustrated and described, other embodiments are contemplated and many changes and modifications may be made within the scope of the appended claim without departing from the spirit of the invention.

Having thus set forth and disclosed the nature of this invention, what is claimed is:

A crupper comprising a vertically upstanding flexible body portion of arcuate cross section having a top edge of greater extent than its lower edge, stiffening stays secured along the side edges of said body portion, straps secured to each end of said top edge, buckles at the ends of said straps, a body strap secured to and extending forwardly from each end of the lower edge of said body portion, said body straps being connected together at their forward ends, a buckle adapted for connection of said body straps to the top center of a surcingle, a butt strap secured to and extending forwardly and downwardly from each end of the lower edge of said arcuate body portion, a buckle at the free end of each body strap adapted for connection to the side portion of a surcingle, and a pair of crossed adjusting straps, each adjusting strap being secured at one end to one of said body straps at a point spaced rearwardly from their point of connection, said adjusting straps each engaging, at its unsecured end, to one of said buckles at the ends of said first mentioned straps.

References Cited in the file of this patent

UNITED STATES PATENTS

| 899,661 | Ellis | Sept. 29, 1908 |
| 1,003,564 | Williamson | Sept. 19, 1911 |
| 1,047,808 | Hinkle et al. | Dec. 17, 1912 |
| 1,991,299 | Swaggerty | Feb. 12, 1935 |

FOREIGN PATENTS

| 7,403 | Great Britain | of 1837 |